(12) United States Patent
deCler et al.

(10) Patent No.: US 7,469,472 B2
(45) Date of Patent: Dec. 30, 2008

(54) METHOD OF MAKING MOLDED COUPLER

(75) Inventors: Charles Peter deCler, Edina, MN (US); Grant Armin Wilhelm, Plymouth, MN (US)

(73) Assignee: Colder Products Company, Saint Paul, MN (US)

( * ) Notice: Subject to any disclaimer, the term of this patent is extended or adjusted under 35 U.S.C. 154(b) by 542 days.

(21) Appl. No.: 11/343,615

(22) Filed: Jan. 30, 2006

(65) Prior Publication Data

US 2006/0138704 A1 Jun. 29, 2006

Related U.S. Application Data

(62) Division of application No. 10/612,475, filed on Jul. 2, 2003.

(51) Int. Cl.
*B23P 25/00* (2006.01)
*B29C 45/00* (2006.01)
*F16L 37/00* (2006.01)

(52) U.S. Cl. .............. 29/890.12; 29/890.124; 29/890.125; 29/890.127; 29/527.1; 285/285.1; 285/305; 264/299; 264/328.1; 264/279; 264/279.1

(58) Field of Classification Search ............ 29/888.4, 29/888.46, 890.12, 890.124, 890.125, 890.127, 29/527.1; 285/317, 285.1, 293.1, 305, 53, 285/54; 137/614.04; 264/241, 250, 259, 264/260, 279, 279.1, 328.1, 328.15
See application file for complete search history.

(56) References Cited

U.S. PATENT DOCUMENTS

| | | | |
|---|---|---|---|
| 433,750 A | 8/1890 | Shields | |
| 3,097,865 A | 7/1963 | Zeeb et al. | |
| 3,291,670 A | * 12/1966 | Usab | ............ 156/245 |
| 3,799,584 A | 3/1974 | Slocum | |
| 4,296,950 A | 10/1981 | Chamberlin | |
| 4,566,723 A | 1/1986 | Schulze et al. | |
| 4,863,201 A | 9/1989 | Carstens | |
| 5,127,678 A | 7/1992 | Henning | |
| 5,158,327 A | 10/1992 | Rowe | |
| 5,403,041 A | 4/1995 | Merkel et al. | |
| 5,451,031 A | 9/1995 | Purvis et al. | |
| 5,494,074 A | 2/1996 | Ramacier, Jr. et al. | |
| 5,636,877 A | 6/1997 | Purvis et al. | |
| 5,733,145 A | 3/1998 | Wood | |
| 5,884,943 A | 3/1999 | Katzer et al. | |
| 5,917,148 A | 6/1999 | Woehl et al. | |
| 5,938,244 A | 8/1999 | Meyer | |
| 6,024,124 A | 2/2000 | Braun et al. | |
| 2002/0041094 A1 | 4/2002 | Twyman | |

* cited by examiner

*Primary Examiner*—Jermie E Cozart
(74) *Attorney, Agent, or Firm*—Merchant & Gould P.C.

(57) ABSTRACT

A coupler device for fluid transport that includes a body with an outer sidewall. The body defines a slot disposed proximate one end, and extends in a direction transverse to and through the outer sidewall. A latch assembly is connected with the body. The latch assembly includes at least one outer member being disposed on the outer surface of the body, and is externally exposed of the body. The inner member is connected with an inner member being disposed through the slot. A soft overmold portion is formed over the outer sidewall of the body. The overmold portion includes a shroud portion that extends outward from the outer sidewall, and partially covers the outer member of the latch assembly.

19 Claims, 18 Drawing Sheets

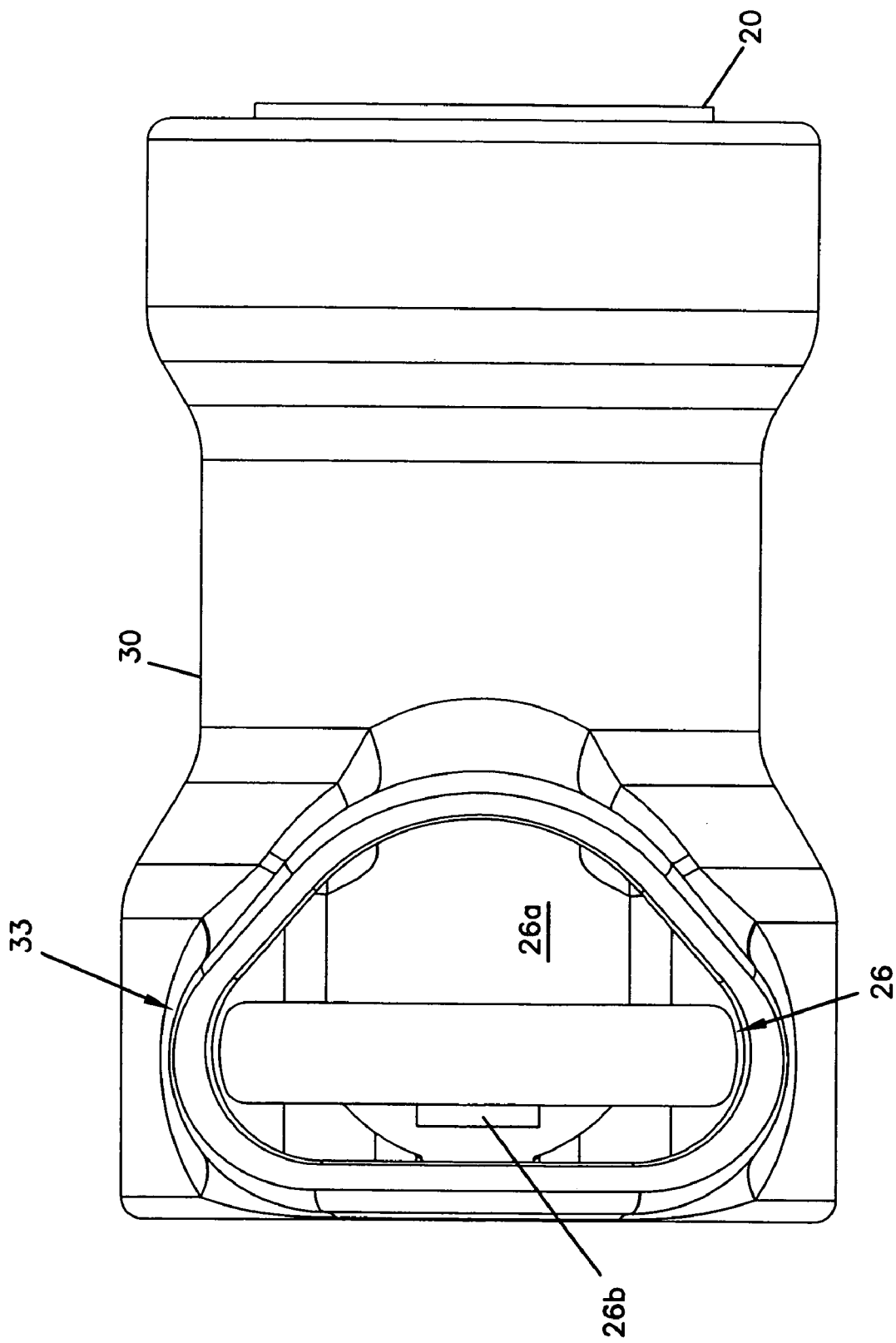

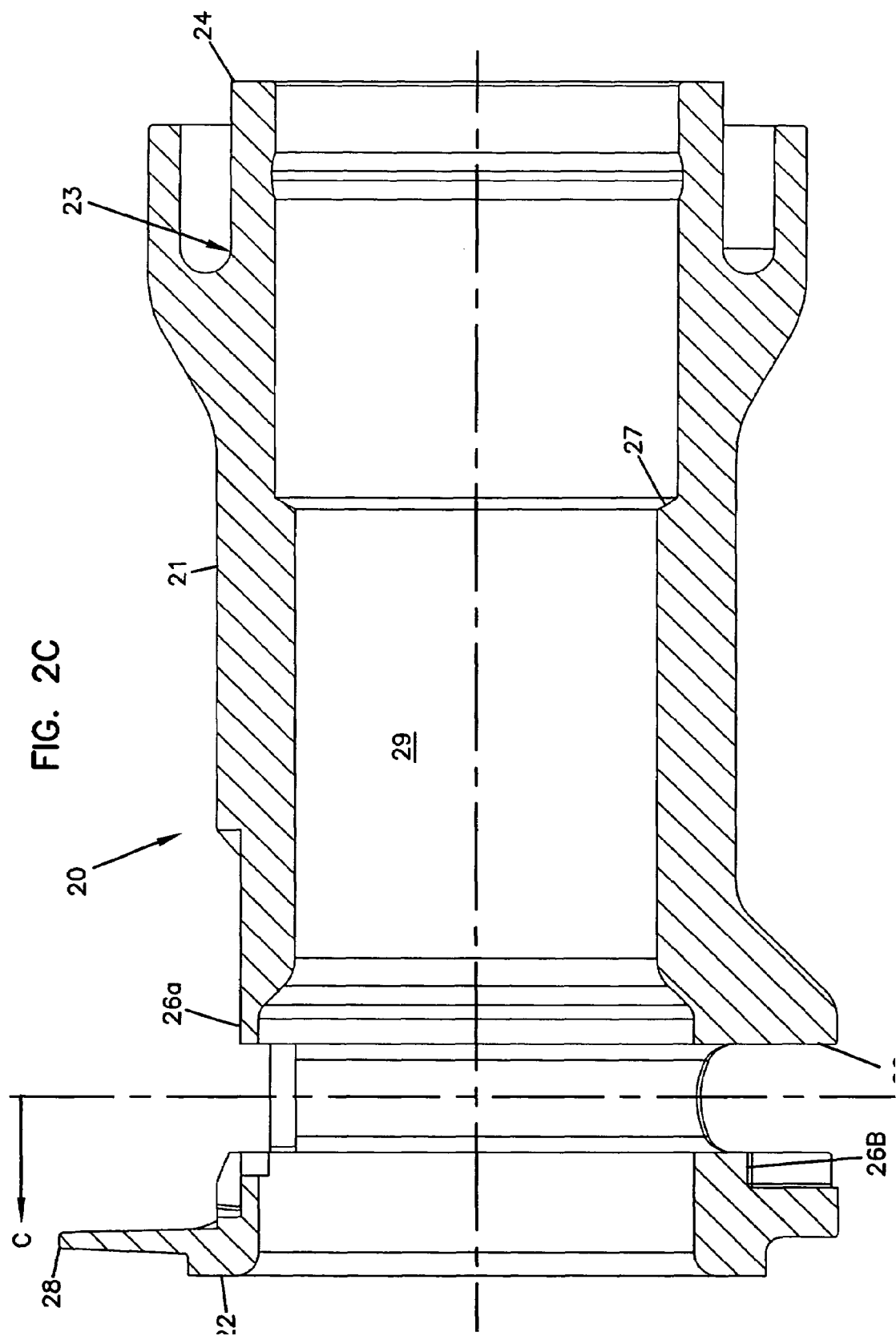

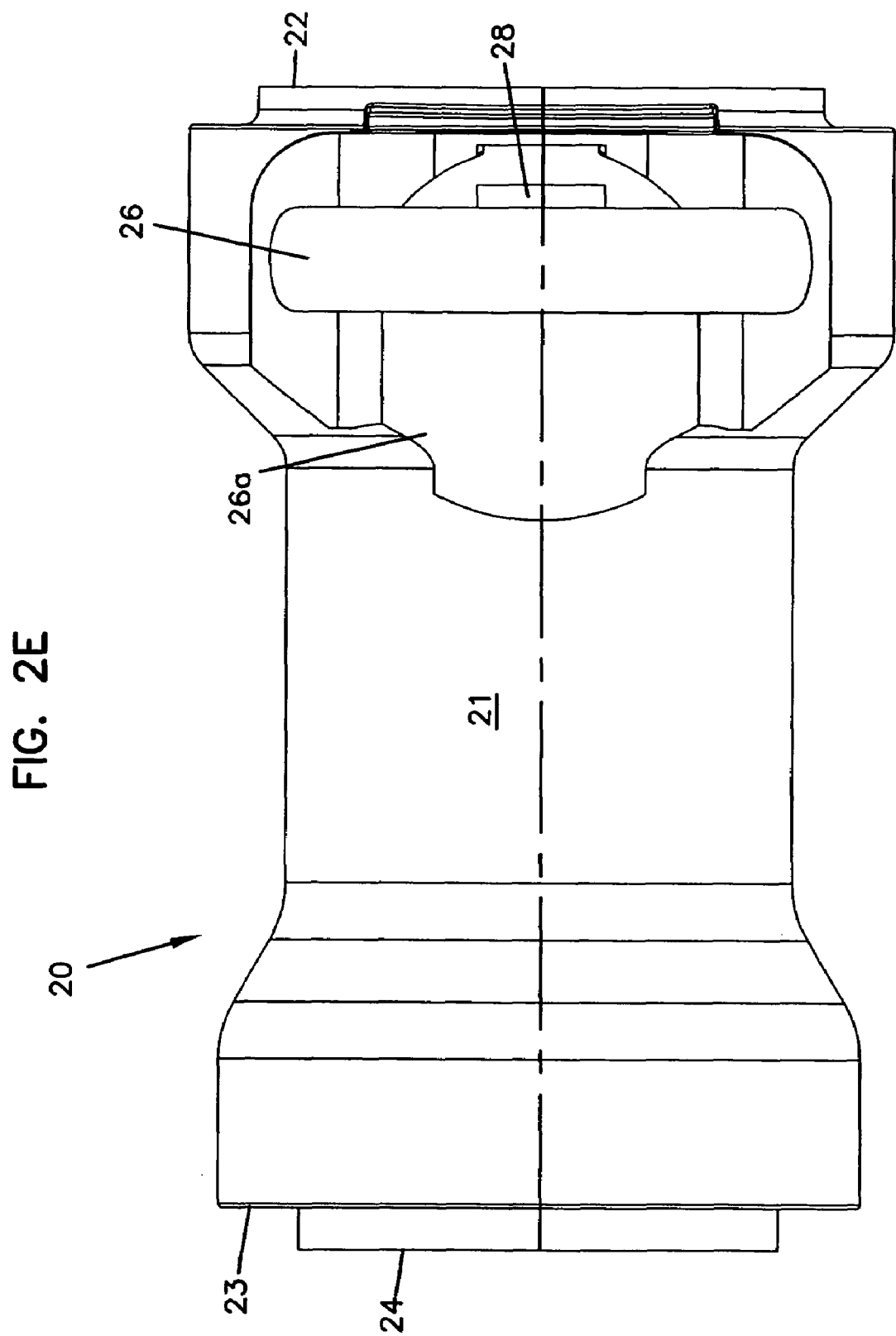

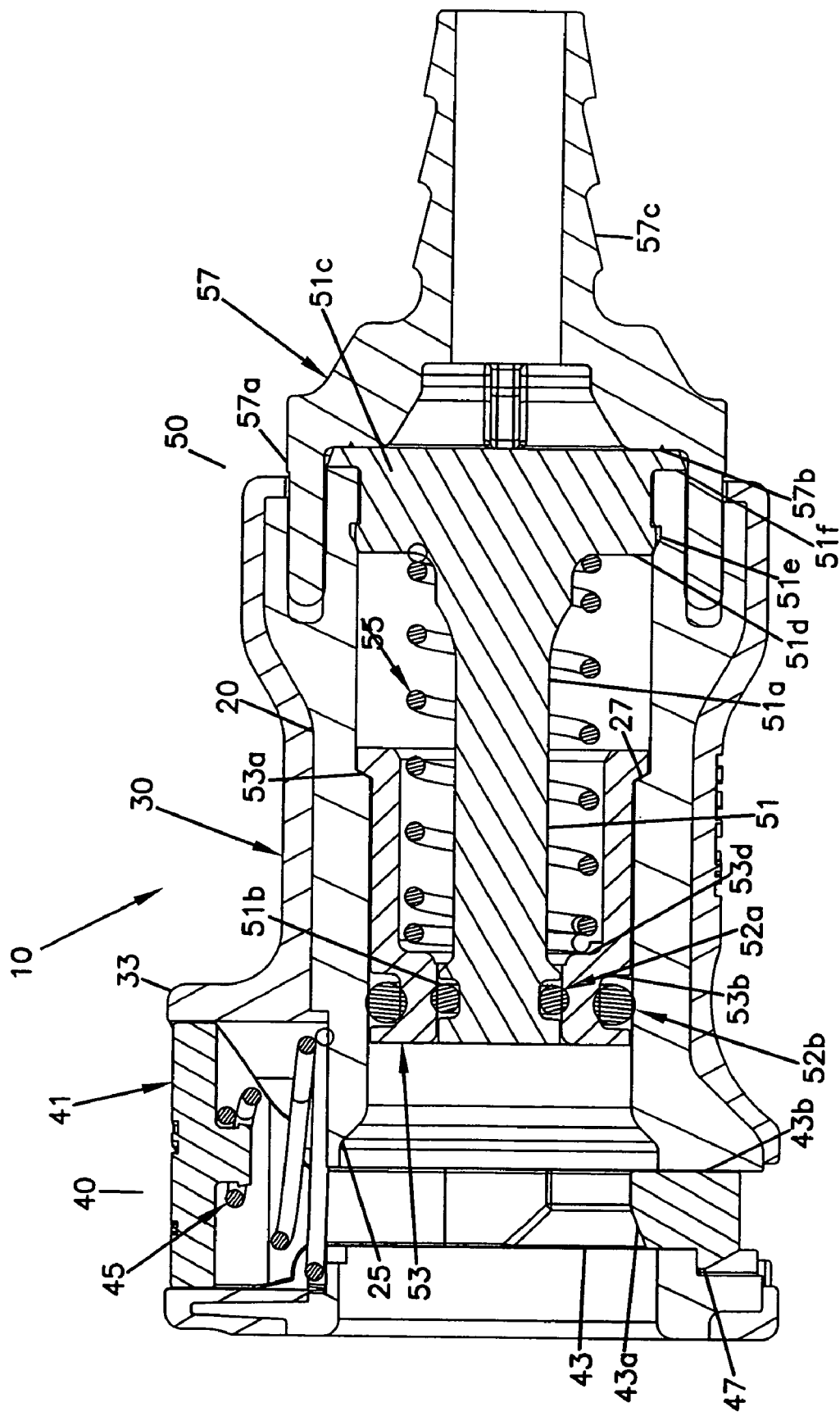

METHOD OF MAKING MOLDED COUPLER

RELATED APPLICATION

This application is a divisional of U.S. patent application Ser. No. 10/612,475 filed on Jul. 2, 2003 which is still pending, the entirety of which is hereby incorporated by reference.

FIELD OF INVENTION

This invention is related to a fluid connector and method of making a molded connector. More particularly, the present invention is related to a fluid connector with a soft overmold.

BACKGROUND OF THE INVENTION

Fluid couplers used in fluid transport applications are common and widely used. Typically, such connectors require proper dimensioning so that seal and/or assembled surfaces can be maintained to provide a no leak, no spill connector. These connectors also employ quick connect/disconnect features having manually operated latches for connecting other pieces of fluid dispensing equipment. Further, valve control parts and assemblies may be employed for controlling fluid flow. Such latch parts and assemblies are often disposed external the main flow bore or channel of the coupling body for user operation and accessibility.

U.S. Pat. Nos. 5,494,074 and 5,938,244 employ latch assemblies including multiple parts that reside out of the bore and on the outer surface of the coupling body. In order to protect these latch assembly parts, vertical sidewalls are formed as part of the main coupling body. To reduce costs, these couplers are formed as integrally molded parts, including such vertical sidewalls and other irregular, non-symmetric structures.

However, in forming these irregular structures on a coupling body, problems can occur in the dimensions of the inner bore and flow channel. In the molding process while transiting from thick to thin surfaces to provide for non-symmetric shapes, the flow channel dimensions, for instance, may become distorted. This distortion can occur due to the unpredictability of the resulting molded part, and can produce coupling body dimensions with inconsistent results. The unpredictability occurs when a molded part designed with inconsistent wall sections (combination of thick and thin wall sections) is injection molded and then allowed to cool post-mold. The plastic material shrinks as it cools and causes dimensional deformation, and may occasionally produce internal voids. Furthermore, different plastic materials may not have the same shrink characteristics.

While shrinkage is anticipated and accounted for in the build of a molding tool, the solution may not be as uniform or linear as engineering simulations and models suggest. Molding tools generally are built using an overall shrink compensation factor. An experienced tool builder can then make additional dimension modifications to the desired scale of the molding tool, and compensate for problems that the models do not predict. Further, post-mold shrinkage is not consistent from cycle to cycle, and sometimes the part-to-part differences can be dramatic. Such problems can be further aggravated by asymmetric parts or parts having thick wall sections or sharp corners.

For coupling bodies that require tight, specific dimensions and that undergo this distortion, the sealing and/or assembled surfaces inside the bore may be compromised. Typically, this distortion can make it necessary to go back and fine-tune the coupling body part back to specification requirements.

While the above devices are suitable for their purposes, there is a need for an improved coupler device including a soft overmold portion that provides the non-symmetrical structure needed to protect and cover any parts outwardly extending from the coupling body. Further, a coupling device is needed where the coupling body avoids dimension distortion and where sealing surfaces and other assembled surfaces are preserved. A connector is desired that provides a design suitable for quick connect/disconnect couplers, while being produced with lower cost and higher efficiency.

SUMMARY OF THE INVENTION

In accordance with the present invention, the above and other problems were solved by providing a coupler device with a soft-overmold portion formed over a main body. The overmold portion forms a partial cover over a latch assembly that protrudes outside the outer sidewall of the main body, where the latch assembly is used for quick connection/disconnection of the coupling device to another piece of fluid transport equipment.

In one embodiment, a coupler device includes a body with an outer surface being an outer circumferential sidewall. The outer sidewall has a first end and a second end with an opening extending through the first and second ends. The body defines a slot disposed proximate one of the first end or second end. The slot extends in a direction transverse to the opening and through the outer sidewall. A latch assembly includes at least one outer member being disposed outside the body, and is connected with an inner member being disposed through the slot. The outer member protrudes from the outer surface and reciprocates with respect to the outer sidewall. The inner member reciprocates within the slot, and is in fluid communication with the opening, whereby the body is releasably connectable with a piece of fluid transport equipment through the inner member. An overmold portion is formed over the outer sidewall of the body. The overmold portion includes a shroud portion partially covering the outer member of the latch assembly.

Preferably, the body is constructed of a molded material. More preferably, the molded material is a plastic material, where the body is a material more rigid than the overmold portion.

Preferably, the overmold portion is a soft overmold material that is more soft and flexible than the body.

Preferably, the opening defined in the body is substantially radially symmetrical.

Preferably, the shroud portion is a wall formed around the outer member of the latch assembly. More preferably, the wall protrudes a distance away from the outer surface at least the same as a distance that the outer member protrudes.

Preferably, the body is connectable to a fluid line at the end opposite the end where the slot is disposed.

In one embodiment, a coupler device further includes a valve assembly insertable into one of the first and second ends of the body opposite the slot, and being in fluid communication with the opening. The valve assembly contains a poppet member, a sleeve and a biasing member. The poppet member is coaxially mounted within the opening of the body. The sleeve is disposed between the poppet member and an inner wall of the body. The sleeve is slidably engaged with the poppet member and the inner wall, where the biasing member is disposed coaxially between the sleeve and the poppet member. The biasing member biases the sleeve in sealing engagement with the poppet member, such that the valve assembly is in the normally closed position.

In another embodiment, a coupler device further includes an insert assembly connected to the body in a quick connect/disconnect configuration. The insert assembly is connectable at the end where the slot and latch assembly is disposed. The insert includes a body with a first end and a second end, where an opening is defined between said first and second ends. The insert includes a valve assembly that is operatively engageable with the valve assembly of the body. The valve assembly includes a poppet member slidingly engaged within the opening. A biasing member disposed between one of the first or second ends and the poppet member for biasing the poppet member into a normally closed position and in sealing engagement with the opening.

In one embodiment, a method of making a molded coupler includes forming a molded body having an outer surface being an outer sidewall. The outer sidewall contains a first end and a second end with an opening extending through the first and second ends. The body defines a slot disposed proximate one of the first end or second end. The slot extends in a direction transverse to the opening and through the outer sidewall. An overmold portion is formed over the outer sidewall of the body, and a shroud is formed while forming the overmold portion. The shroud portion protrudes outward a distance transverse to the outer surface. A latch assembly is provided and disposed within the slot. The latch assembly includes at least one outer member being disposed outside the molded body, and connected with an inner member being disposed through the slot. The outer member protrudes from the outer surface of the body. The shroud portion protrudes a distance, such that the shroud portion partially covers the outer member.

These and other various advantages and features of novelty, which characterize the invention, are pointed out in the following detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 1D represents one side view of the coupler body with a soft overmold of FIG. 1A illustrating one embodiment of a slot and shroud portion.

FIG. 2C represents a sectional view of the coupler body of FIG. 2A taken from line B-B of FIG. 2B

FIG. 2E represents one side view of the coupler body of FIG. 2A.

FIG. 3C represents a sectional view of the coupler device of FIG. 3A taken from line D-D of FIG. 3B and illustrating sectional views of the valve assembly and fluid line.

DETAILED DESCRIPTION OF THE PREFERRED EMBODIMENT

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

Figure 1A:
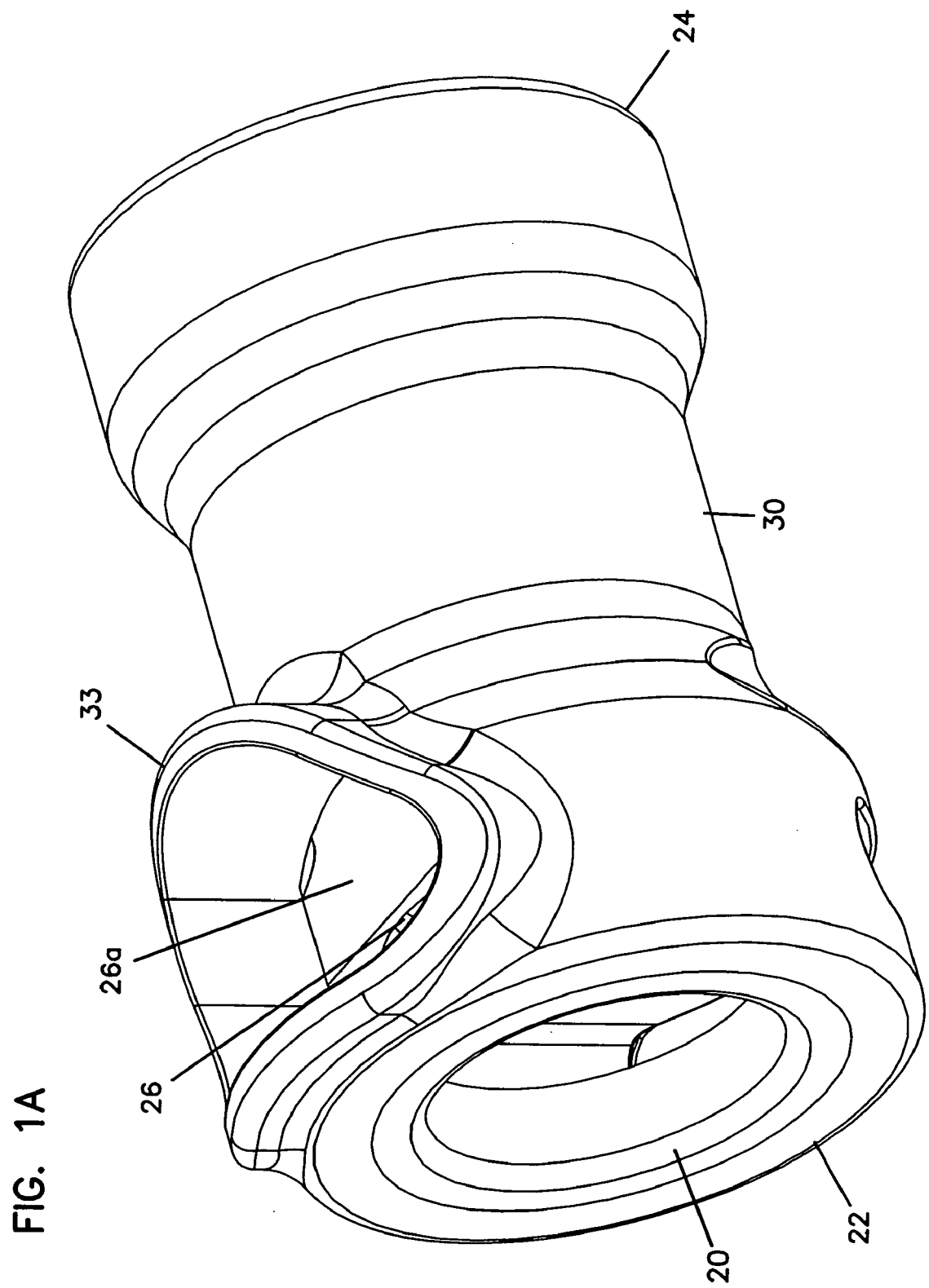
FIG. 1A represents a perspective view of one embodiment of a coupler body with a soft overmold in accordance with the principles of the present invention.
Figure 1B:
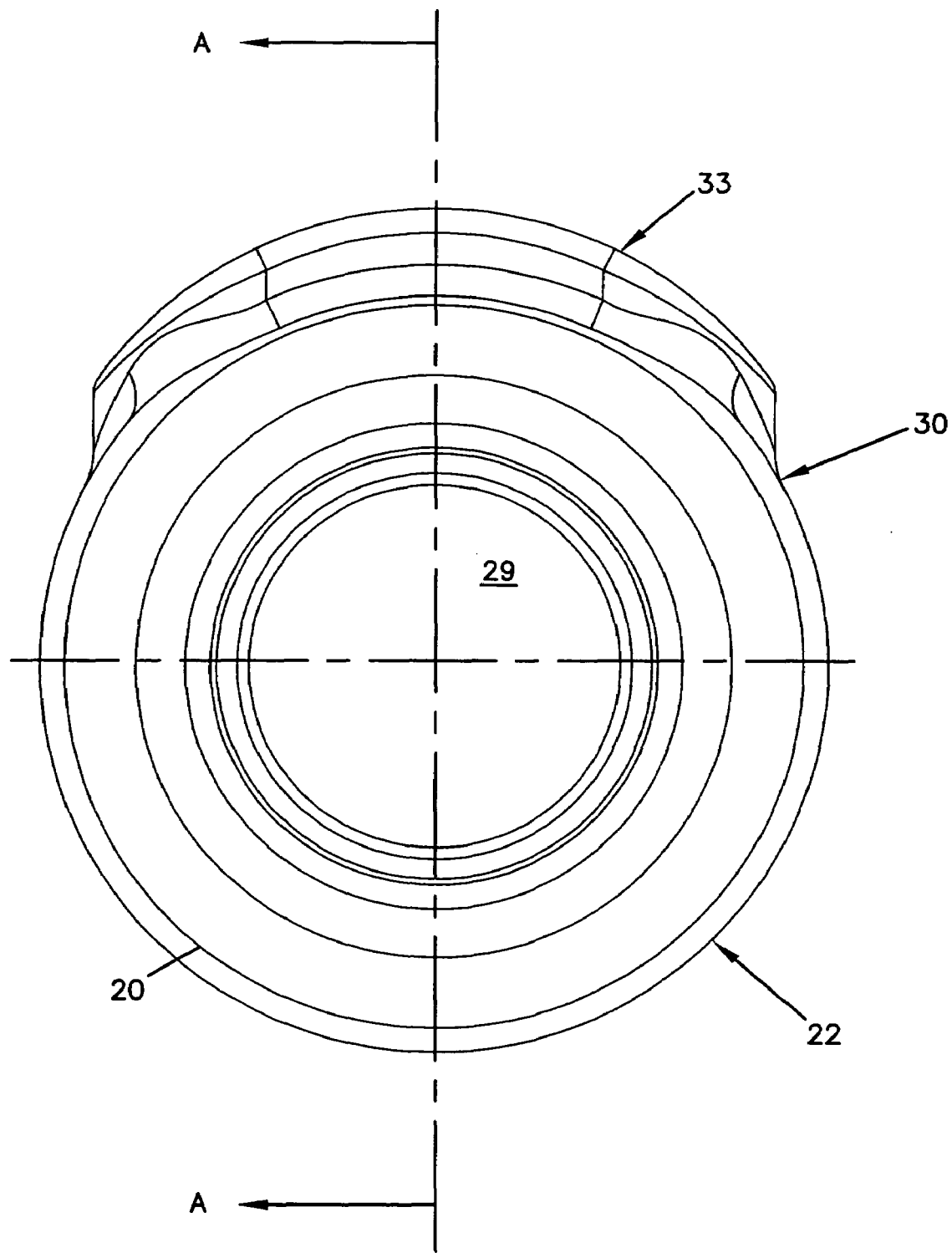
FIG. 1B represents one end view of the coupler body with a soft overmold of FIG. 1A.
Figure 1C:
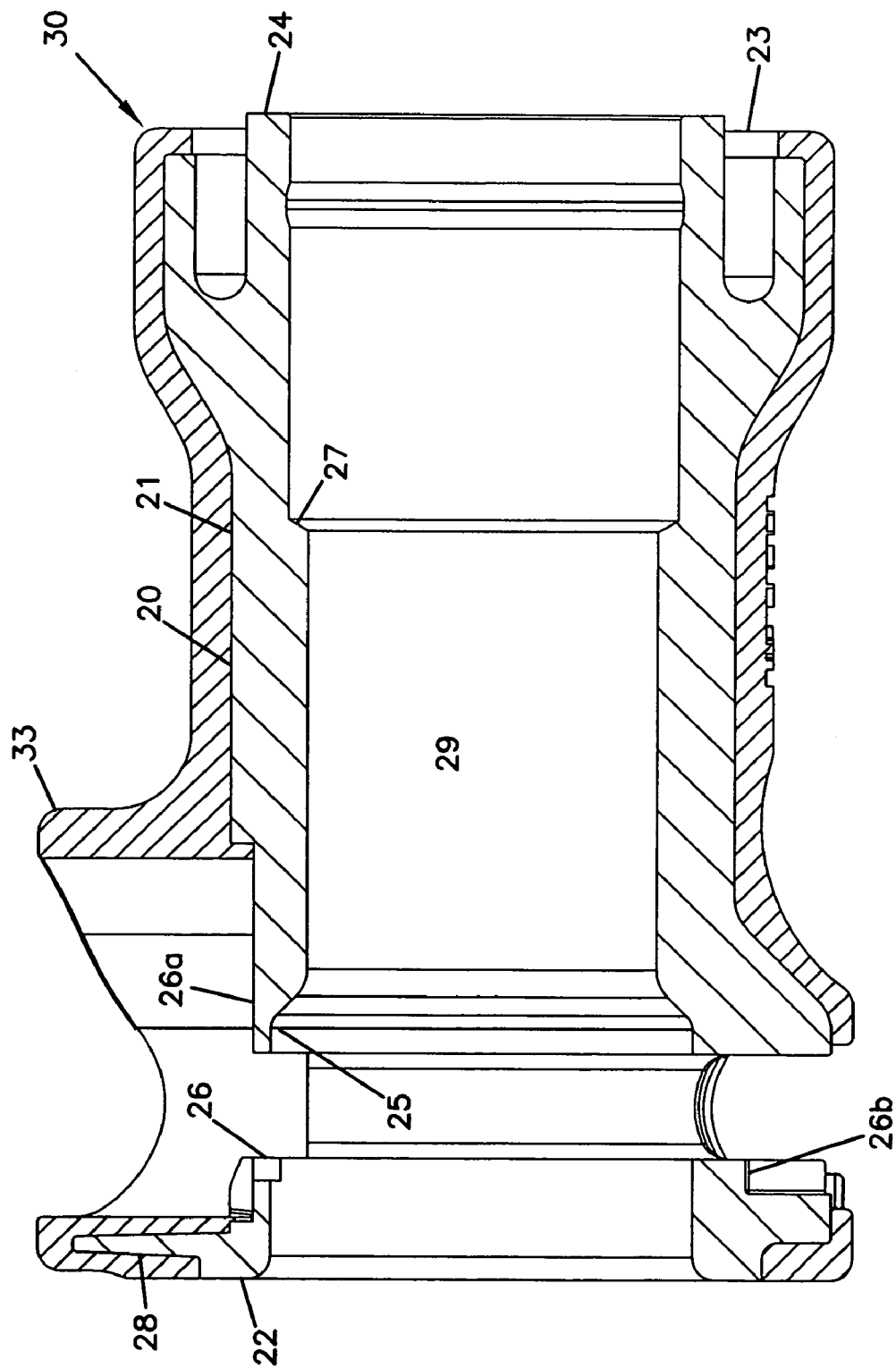
FIG. 1C represents a sectional view of the coupler body with a soft overmold of FIG. 1A taken from line A-A of FIG. 1B.
Figure 1E:
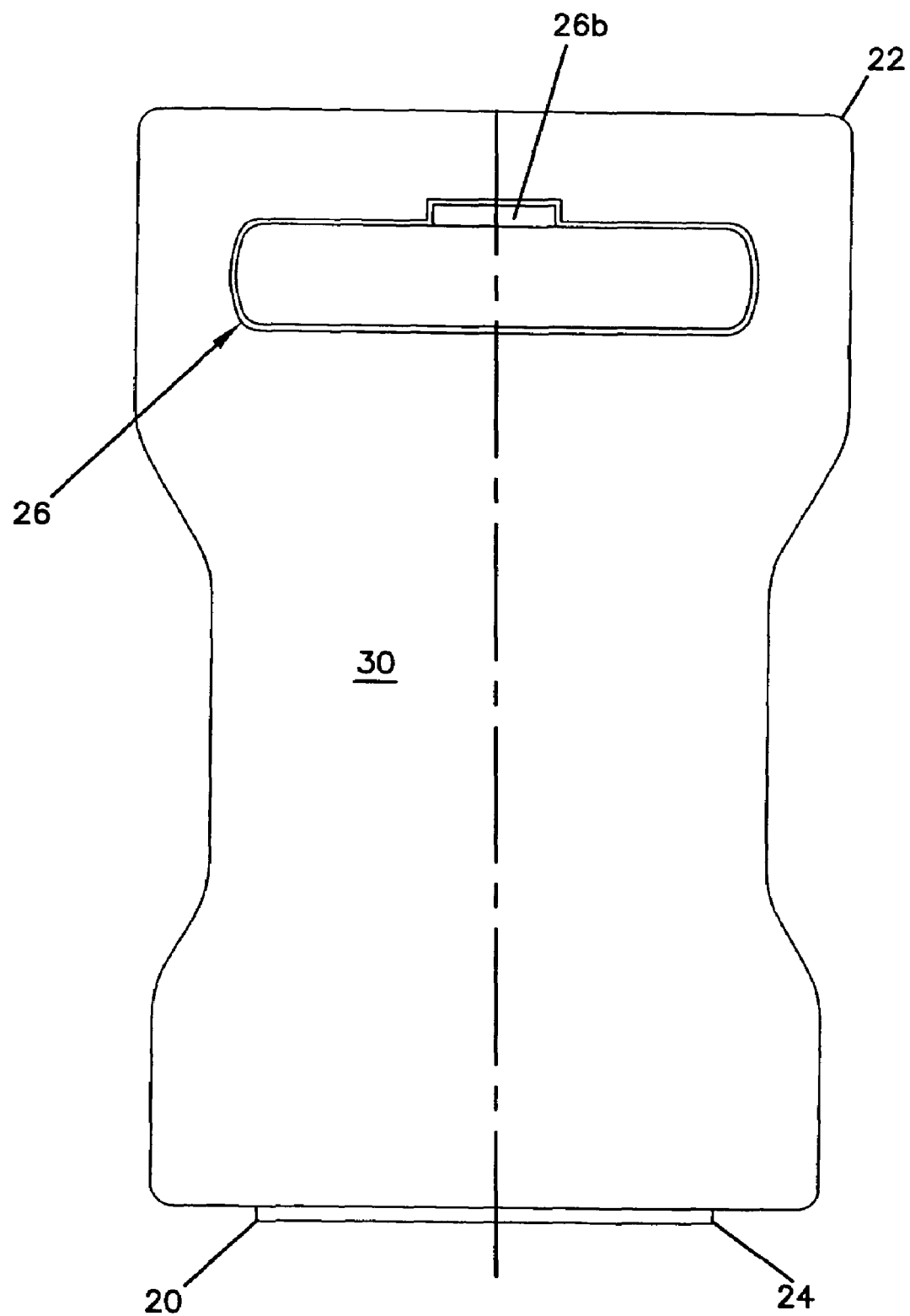
FIG. 1E represents one side view of the coupler body with a soft overmold of FIG. 1A opposite the side view of FIG. 1D.
Figure 2A:
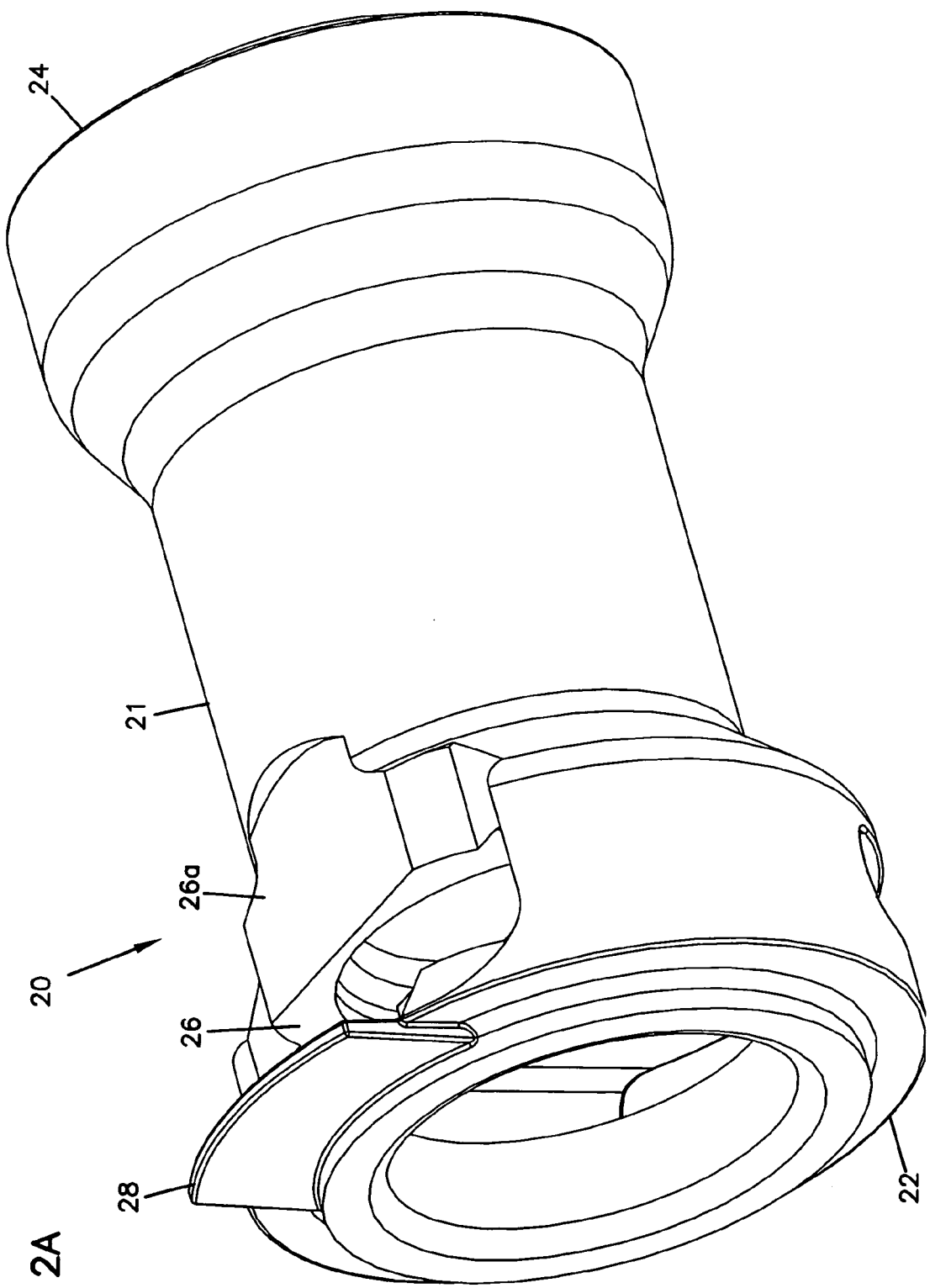
FIG. 2A represents a perspective view of one embodiment of the coupler body alone of FIG. 1A in accordance with the principles of the present invention.
Figure 2B:
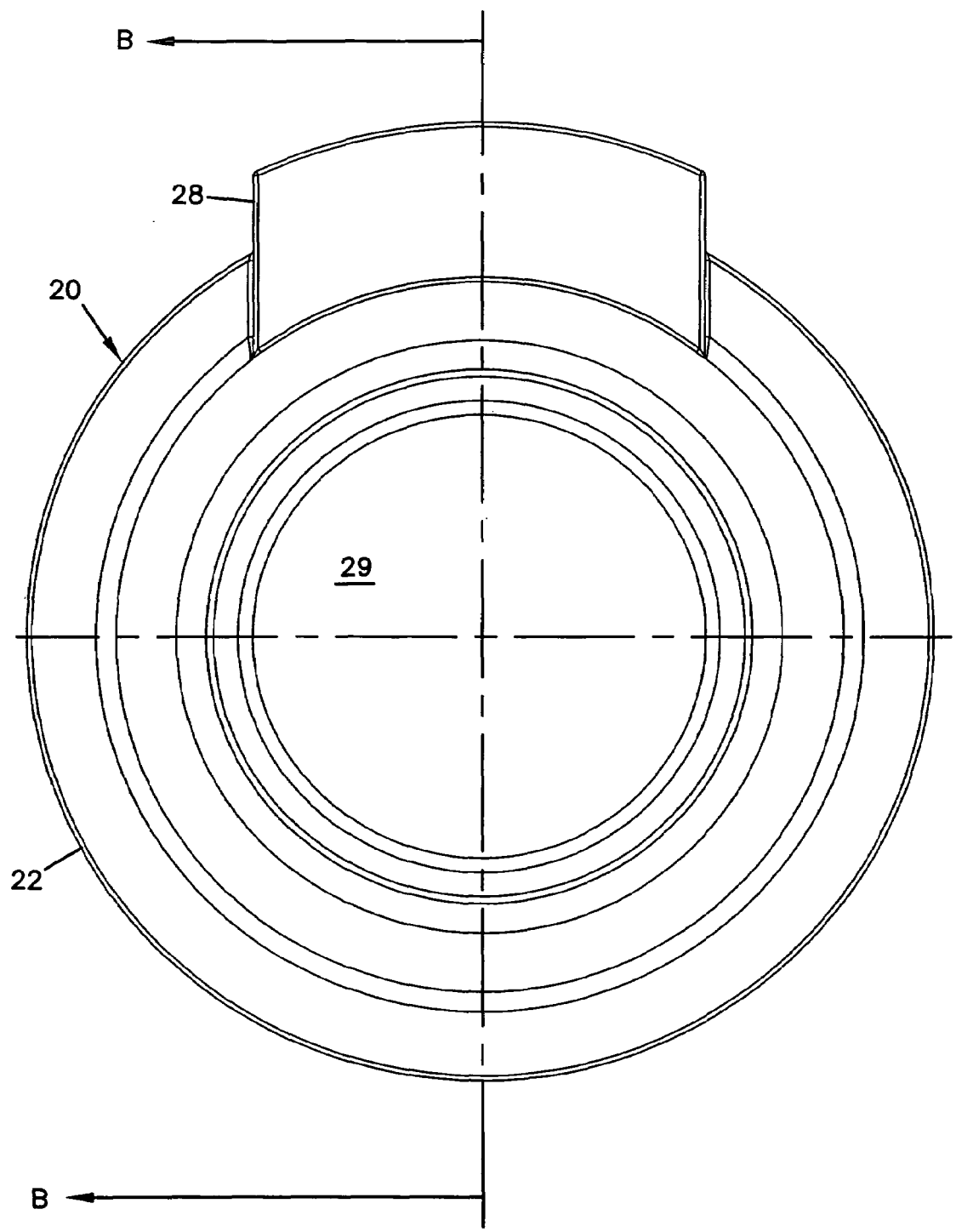
FIG. 2B represents one end view of the coupler body of FIG. 2A.
Figure 2D:
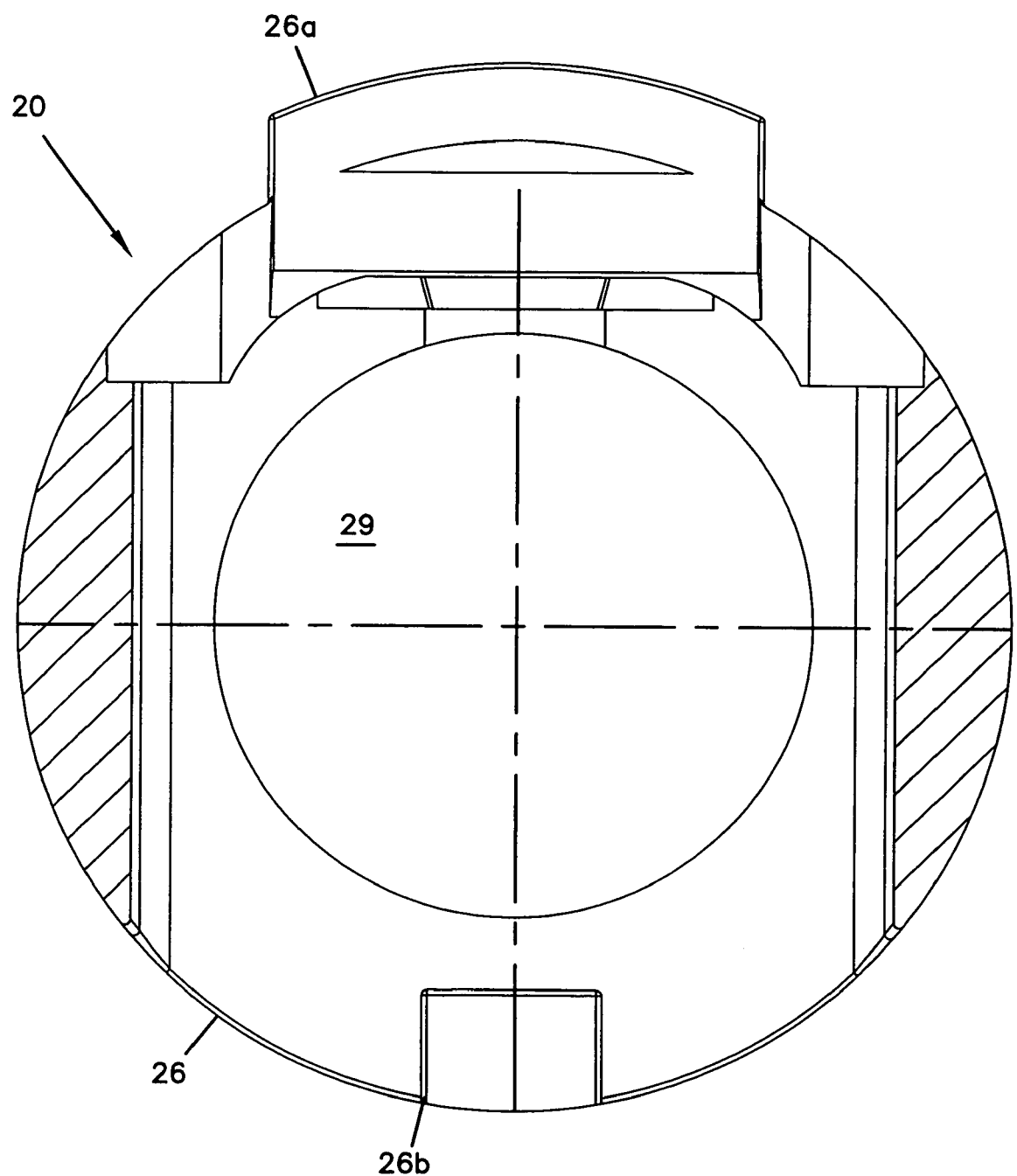
FIG. 2D represents another sectional view of the coupler body taken from line C-C of FIG. 2C.

FIGS. 1A through 1E illustrate one preferred embodiment of a coupler body 20 with a soft overmold 30. The coupler body 20 includes an outer surface being an outer sidewall 21 with a first end 22 and a second end 24. Preferably, the outer sidewall 21 is a radially shaped outer sidewall forming a substantially cylindrical shaped coupler body. An opening 29 extends through the first and second ends 22, 24, and substantially resembles a longitudinal bore extending through the coupler body 20. The body defines a slot 26 proximate the first end 22. Preferably, the slot 26 extends in a direction transverse to the opening 29 and through the outer sidewall 21. As best illustrated in FIG. 1C, the slot 26 extends through opposite portions of the outer sidewall 21.

A connection means 23 is disposed at the second end 24, such that the coupler body 20 is connectable to a piece of fluid transport equipment. Preferably, the connection means 23 is defined by a groove formed between the outer sidewall 21 and the opening 29. As illustrated, the groove is a socket fitting where a suitable mating coupling member can be inserted. A piece of fluid transport equipment may be any suitable coupling member or connector mateable with the connection means 23, for connecting the coupler body 20 to a well-known fluid transport system or fluid line. It will be appreciated that the connection means is not limited to the specific configuration illustrated, as other socket fitting configurations and/or interference fittings may be employed.

For purposes of describing one preferred structure for the present invention, the slot 26 and connection means 23 have been defined at first and second ends 22, 24, respectively. It also will be appreciated that a coupler body 20 may include the slot 26 proximate the second end 24 and the connection means 23 at the first end 22.

In one most preferred embodiment, the slot 26 is formed to mechanically retain and engage a latch assembly 40, which is further described below, for releasably connecting the coupler body 20 to a piece of fluid transport equipment. By way of example only, the piece of fluid transport equipment may be another connector, such as a mating insert valve, mating coupler valve or a fluid line. A recessed face 26a may be disposed on the outer surface about said slot 26. The recessed face 26a extends in a direction along the outer sidewall 21 toward said first and second ends 22, 24. The recessed face 26a provides a space for members of the latch assembly 40 to comfortably be disposed. Preferably, the recessed face 26a is a substantially planar face. A retention shoulder 26b is disposed adjacent the slot 26. Preferably, the retention shoulder 26b is oppositely disposed from the recessed face 26a. The retention shoulder 26b retains the latch assembly 40 within the slot 26 (best shown in FIG. 3C). As illustrated in the top and bottom views of FIGS. 1D and 1E, the recessed face 26a can define a top portion of the coupler body 20, and the retention shoulder 26b can define an opposite bottom portion of the same. It will be appreciated that such top and bottom designations are for illustrative purposes only, as the top portion may be defined with the retention shoulder 26b and the bottom portion may be defined with the recessed face 26a.

As above, the slot 26, recessed face 26a and retention shoulder 26b are formed to mechanically engage and retain a latch assembly. It is well known that such latch assemblies, as hereinafter described, are used in quick connect/disconnect couplings. Such latch assemblies are disposed within the slot 26, and include manually operated parts residing outside of the coupler body 20 and extending away from the outer sidewall 21. It will be appreciated that mechanisms other than a latch assembly may be constructed and arranged, so as to be disposed and retained in the slot 26. By way of example only, such mechanisms may be valve actuators that also include manually operated parts residing externally of the outer sidewall 21 of the coupler body 20.

The coupler body 20 may further include first and second shoulder portions 25, 27 formed within the opening 29. Preferably, the first shoulder portion 25 is disposed proximate the first end 22, and more preferably adjacent the slot 26 on the backside of the slot toward the second end 24. As shown and described, the first shoulder portion 25 is formed as a tapered annular surface about the inside of the opening 29, where the diameter is greater toward the slot 26. The first shoulder portion 25 limits the amount of insertion for a connecting insert.

The second shoulder portion 27 preferably is disposed downstream from the first shoulder portion 25 and toward the second end 24. The second shoulder portion 27 is formed as an annular surface such that the diameter is greater toward the second end 24. The second shoulder portion 27 provides a suitable stop surface for a valve assembly or other fluid transport control structures that are incorporated within the opening 29.

FIGS. 2A through 2E illustrate individual views of the coupler body 20 without the overmold 30.

As shown and described, the overmold 30 is formed substantially about the outer sidewall 21 of the coupler body 20. Preferably, the overmold 30 is formed directly over the outer sidewall 21 as an additional molded layer. The overmold 30 is a material relatively softer than the more rigid coupler body 20. The overmold 30 includes a shroud portion 33 that extends transversely outward from the outer sidewall 21, and is disposed as a wall about the recessed face 26a and adjacent the slot 26. The shroud portion 33 is open faced from the top and exposes the slot 26 and recessed face 26a. Preferably, the shroud portion 33 extends a distance perpendicularly from the outer sidewall 21 and forms a well-shaped structure about the recessed face 26a. The shroud portion 33 provides a partial cover for external structures disposed outside of the coupler body 20. More preferably, the shroud portion 33 partially covers and protects external structures, such as manually operated parts of the latch assembly 40 that reside outside the coupler body 20. The shroud portion 33 is formed of the same material as the overmold 30, and preferably is made from the same tool in the same molding process. Preferably, the shroud portion is resilient while maintaining its well shape.

In a further preferred embodiment, the coupler body 20 may be formed with an indexing rim 28. The indexing rim 28 is formed proximate the first end 22, and disposed adjacent the recessed face 26a. The indexing rim 28 extends outwardly from the outer sidewall 21. Preferably, the shroud portion 33 is formed over the indexing rim 28, which provides strength and support of the shroud portion 33.

Preferably, the coupler body 20 is a molded part made of a plastic material. The coupler body is a rigid, hard plastic material. More preferably, the coupler body is a molded material being polypropylene. It will be appreciated that other plastic materials and resins may be employed as appropriate for providing the properties of a rigid, plastic molded coupler body.

The overmold 30 is a molded material that is softer than the rigidly molded coupler body 20. Preferably, the overmold 30 is a low tolerance material, and can provide soft touch and ergonomic feeling, while protecting the coupler body 20. More preferably, the overmold 30 is formed of a thermoplastic rubber material suitable for providing such properties. Further, the overmold 30 may be formed as a color overmold for identification purposes.

The coupler body 20 and overmold 30 are formed using well-known injection molding techniques. Further, well-known two-shot molding techniques may be used by first forming the coupler body 20 and subsequently forming the overmold 30 over the coupler body 20. Preferably, the coupler body 20 and overmold 30 are formed for non-spill couplers using flow sizes at about ¼ and ⅜ inches for the opening 29. It will be appreciated that the flow sizes may vary as needed.

By forming a coupler body 20 with the overmold 30 as described above, the coupler body can be molded with tight, specific dimensions, while the overmold 30 can form the shroud portion 33. The shroud portion 33 can cover and protect any exposed irregular shaped parts that are disposed and/or mounted externally of the outer sidewall 21. The coupler body 20 can be formed to avoid distortion or any added windaging inside the bore, which could occur if the coupler body and shrouding were formed as a single non-symmetrically molded part.

By forming the overmold 30 as a separate layer outside the coupling body 20, the outer shape of a coupler can be modified as needed to protect external structures disposed outside the coupler body 20, such as those in the latch assembly 40 discussed below. In this manner, the need to fine-tune the coupling body 20 back to specific dimensions can be avoided. Further, seal surfaces that can require specific dimensions, such as the radial dimension of the inner bore, may be protected as distortion is prevented. Preferably, the coupling body 20 is a substantially uniform and symmetrical part, where any sealing and/or other assembled surfaces that require tight tolerances are preserved. In this configuration, the coupling body 20 may be molded using standard round core pins, while enabling the cycling of the part to be made faster. The coupling body 20 and the overmold 30 can be made with thicker wall surfaces, while avoiding dimensional distortion. A finished coupling body 20 with the overmold 30, defining both under molded and over molded portions and having asymmetric geometry and irregular wall sections, can be efficiently manufactured while avoiding the shrinkage problems that would result from creating a similar geometry using only a single material. As a result, a more convenient coupler can be produced faster and at low cost using inexpensive materials and standard equipment.

Figure 3A:
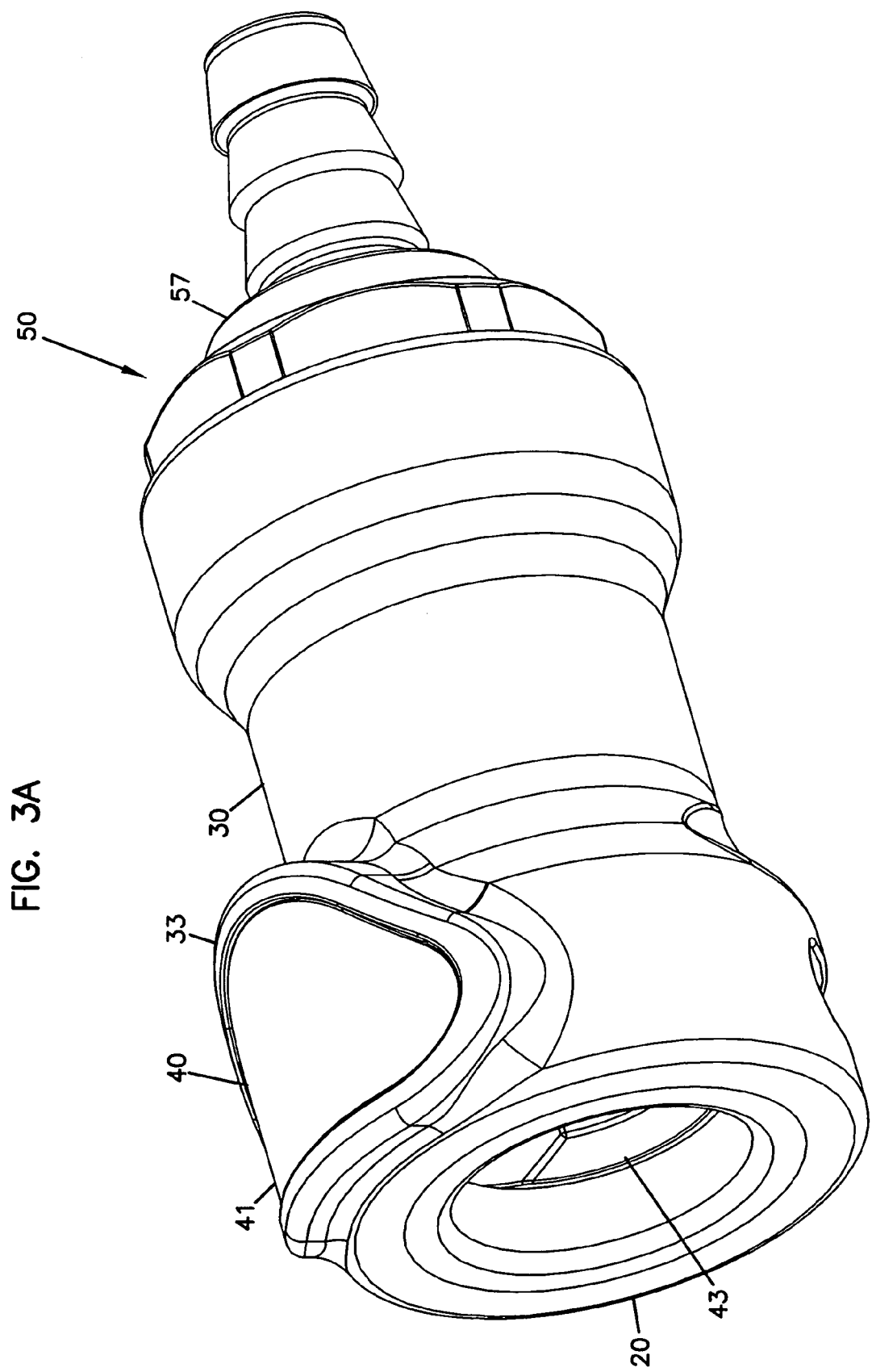
FIG. 3A represents a perspective view of one embodiment of a coupler device illustrating a latch assembly and illustrating the coupler device attached to one embodiment of a valve assembly and fluid line.
Figure 3B:
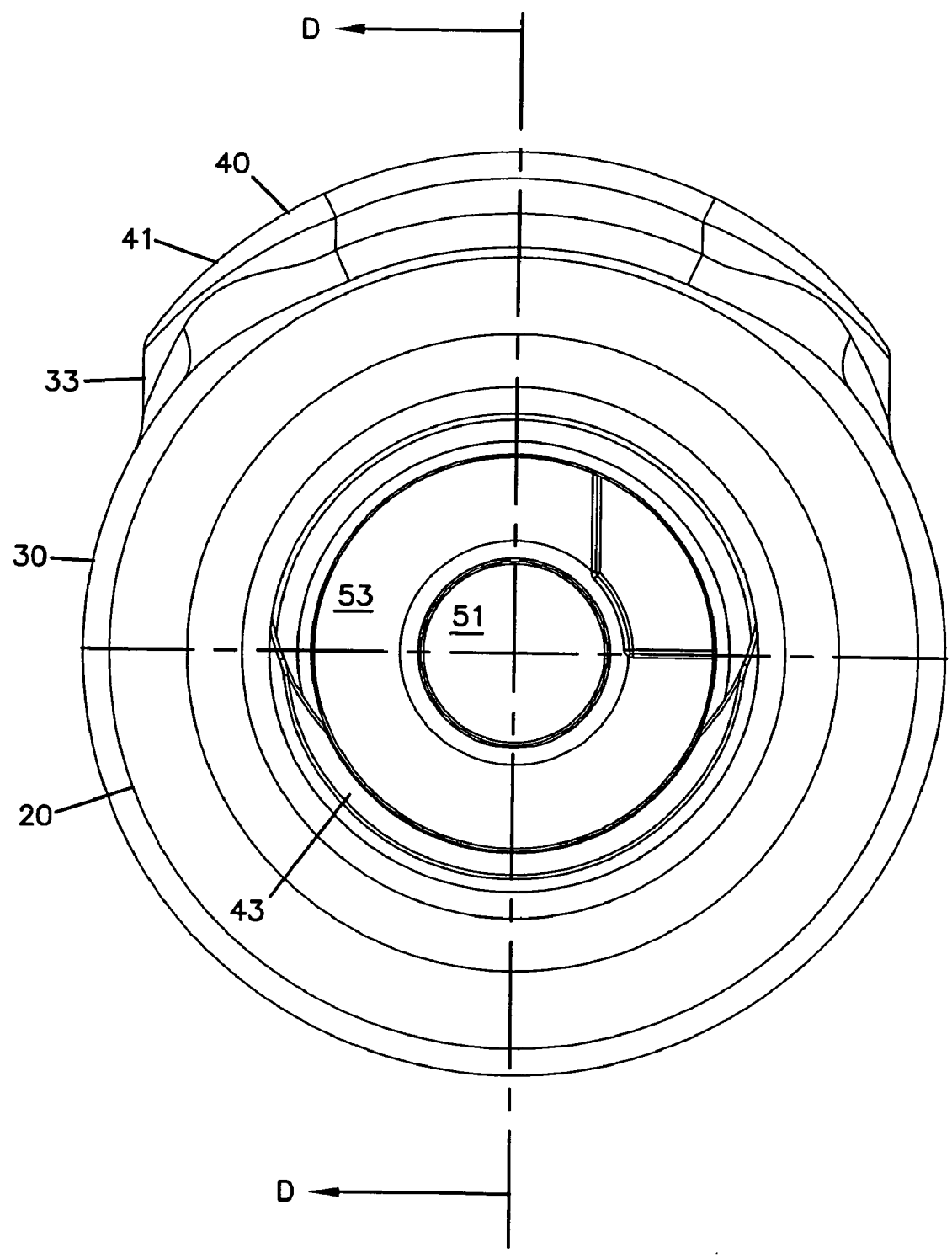
FIG. 3B represents one end view of the coupler device of FIG. 3A.

FIGS. 3A-3C illustrate the coupler device 10, including the coupling body 20, overmold 30 and latch assembly 40, that is releasably connected with a valve assembly 50. In one example only, the latch assembly 40 includes at least one outer member connected with an inner member. The outer member is disposed outside the outer surface of the coupling body 20, and preferably resides within the shroud portion 33 and on the recessed face 26a. Preferably, the outer members include a actuating member 41 and a biasing member 45 protruding outwardly from the outer surface of the coupling body 20 and partially covered by the shroud portion 33. Preferably, the actuating member 41 is a thumb portion. The biasing member 45 is disposed between the actuating member 41 and the recessed face 26a. Preferably, the biasing member 45 is a coiled spring resting on and engaged with the recessed face 26a and under the thumb portion. It will be appreciated other biasing members may be employed.

The inner member is moveably disposed within the slot 26. Preferably, the inner member is a plate 43 having an aperture corresponding with the opening 29 of the coupling body 20, so as to allow insertion and connection of a mating connector therein. The actuating member 41 provides a surface for a user to manually operate the latch assembly 40 for quickly connecting and disconnecting the coupling body 20 with a piece of fluid transport equipment. When activated, the actuating member 41 reciprocates with respect to the outer surface of the coupling body 20 through action of the biasing member 45, so as to move toward and away from the outer sidewall 21. Further, the plate 43 reciprocates within the slot 26, and includes a tapered edge 43a with a transverse edge 43b. The edges 43a, 43b provide a ramp surface and retention shoulder within the opening 29, where a piece of fluid transport equipment, such as a mating insert, can be connected to the coupling body 20. By depressing the actuating member 41, the edges can be moved out of the opening 29 to provide clearance for removal of an insert.

A retention member 47 holds the latch assembly 40 within the slot 26 and on the recessed face. The retention member 47 is oppositely disposed from the outer members 41, 45. The retention member provides a shoulder surface engageable with the retention shoulder 26b. The shroud portion 33 also provides a wall structure so as to position the actuating member 41 and biasing member 45 in engagement with the recessed face 26a. Preferably, the shroud portion 33 is adjacent the outer members 41, 45 extending a distance in a direction transverse to the outer surface of the coupling body 20. More preferably, the shroud portion 33 surrounds the outer members 41, 45, and protrudes at least the same distance from the outer surface of the coupling body as the actuating member 41. In this configuration, the shroud portion 33 can provide suitable protection and cover of the outer members 41, 45.

In one preferred example, the valve assembly 50 is insertable in the second end 24 of the coupling body 20 and opposite the slot 26. The valve assembly 50 is in fluid communication for enabling and disabling flow through the coupling body 20. Preferably, the valve assembly 50 is actuatable from a normally closed position to an open position. The valve assembly 50 includes a poppet member 51, a sleeve member 53 and a biasing member 55.

The poppet member 51 is coaxially mounted within the opening 29 of the coupler body. The poppet member 51 includes a main body 51c with an elongated portion 51a extending toward the first end 22. The elongated portion 51a has a smaller diameter than the portion of the main body 51c proximate the second end 24. The poppet member includes at least one opening in a portion of the main body mounted proximate the second end 24, so as to allow fluid flow therethrough. Proximate the second end 24, the poppet member 51 includes a retention barb 51e annularly disposed thereon. The retention barb 51e provides an interference fit with the inner wall of the coupling body 20. The retention barb 51e retains the poppet member 51 within the coupling body 20, and includes an annular flange 51f that fits against the second end 24 of the coupling body 20.

The sleeve member 53 is coaxially disposed between the poppet member 51 and the inner wall of the coupling body. The sleeve 53 is slidingly engaged with the poppet member 51 and coupling body 20. An annular flange 53a disposed on an end proximate the second end 24 provides a stop structure to engage with the second shoulder 27 of the coupling body 20. This relationship limits movement of the sleeve toward the first end 22. A resilient o-ring 52b is disposed in a groove 53b provides a fluid tight seal with the coupling body 20. The sleeve 53 includes an opening where the poppet member 51 is insertable in a fluid tight seal, such that the valve assembly 50 is in a closed position. An o-ring 52a disposed in a groove 51b of the elongated member 51a sealingly engages the sleeve 53, when the poppet member 51 is inserted in the sleeve 53.

A biasing member 55 biases the valve assembly 50 in a normally closed position, and is disposed coaxially between the sleeve 53 and poppet member 51. The biasing member biases the o-ring 52a to remain in a fluid tight seal with the sleeve 53. Preferably, the biasing member 55 resides between surfaces 53d and 51d of the sleeve 53 and poppet member 51, respectively. More preferably, the biasing member 55 is a coiled spring. The sleeve 53 may be slidingly moved toward the second end 24 when actuated to release the sealing engagement with the poppet member 51, so as to allow fluid flow through the coupling body 20. The valve assembly 50 may be actuated into an open position when, for instance, an insert assembly 60 is inserted into the coupling body 20. Such insert assemblies are further discussed below.

The coupling body 20 may be connected with an adapter 57 for connecting the coupling device 10 to a fluid transport system, such as a well known fluid line (not shown). The adapter 57 is connectable with the connection means 23 having a fitting 57a insertable in the socket structure of the connection means 23. As discussed above, the connection means 23 is not limited to the specific socket fitting structure illustrated, as other well known connection structures may be employed. Likewise, the fitting 57a may be modified as necessary to connect with the connection means 23. The connection means 23 and fitting 57a may cooperate in a fluid tight seal so as to prevent leakage or spill from the coupling device 10 and adapter 57. A barbed outer tubing 57c structure allows the adapter to be connected with a fluid line in an interference fitting arrangement. It will be appreciated that the adapter may employ other structures suitable for connecting the coupling device 10 to a piece of fluid transport equipment or fluid dispensing system. The adapter 57 also may include a shoulder 57b engageable with the annular flange 51f of the poppet member and provides additional support for retaining the poppet member 51.

Figure 4A:
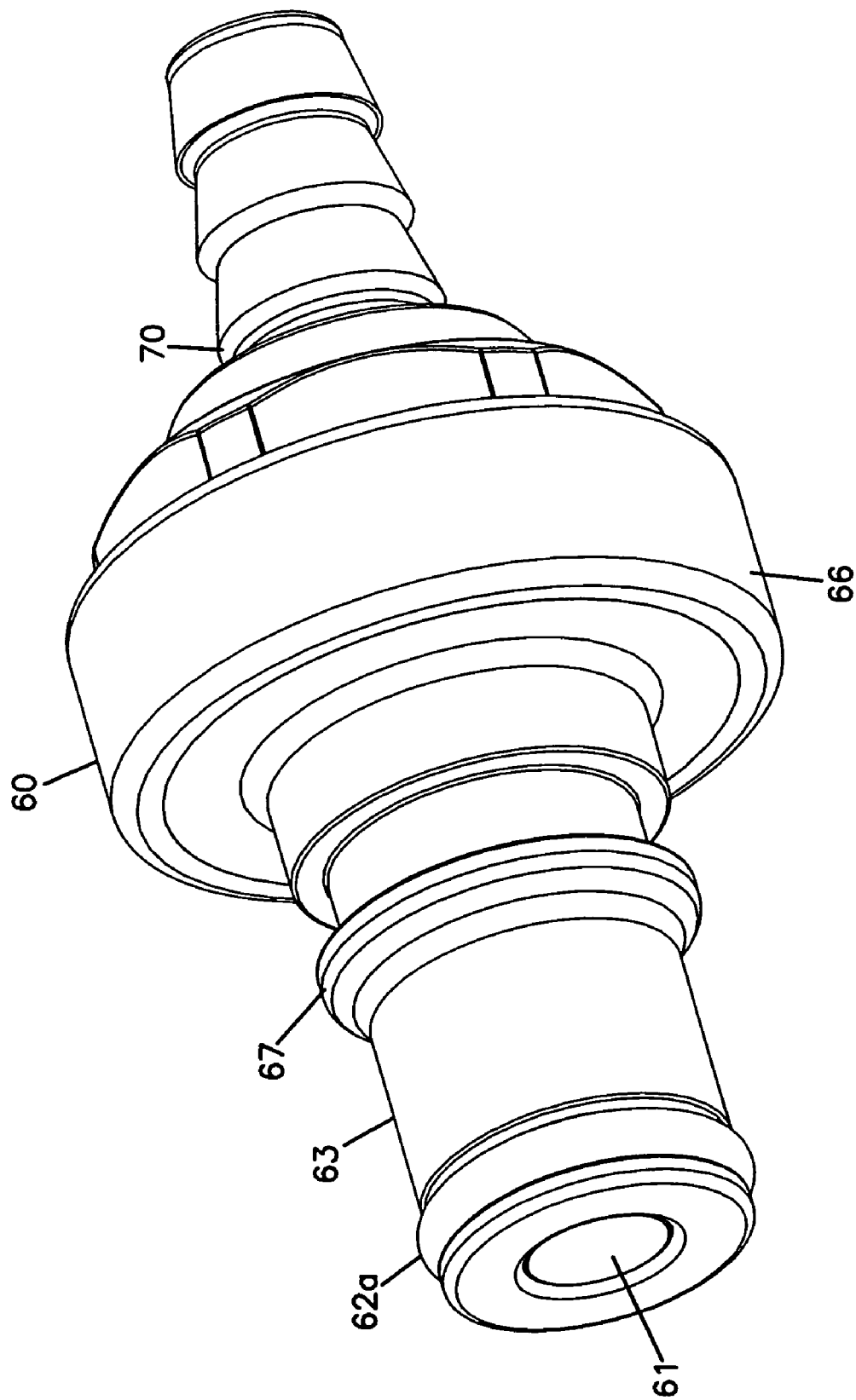
FIG. 4A represents a perspective view of one embodiment of an insert assembly in accordance with the principles of the present invention.
Figure 4B:
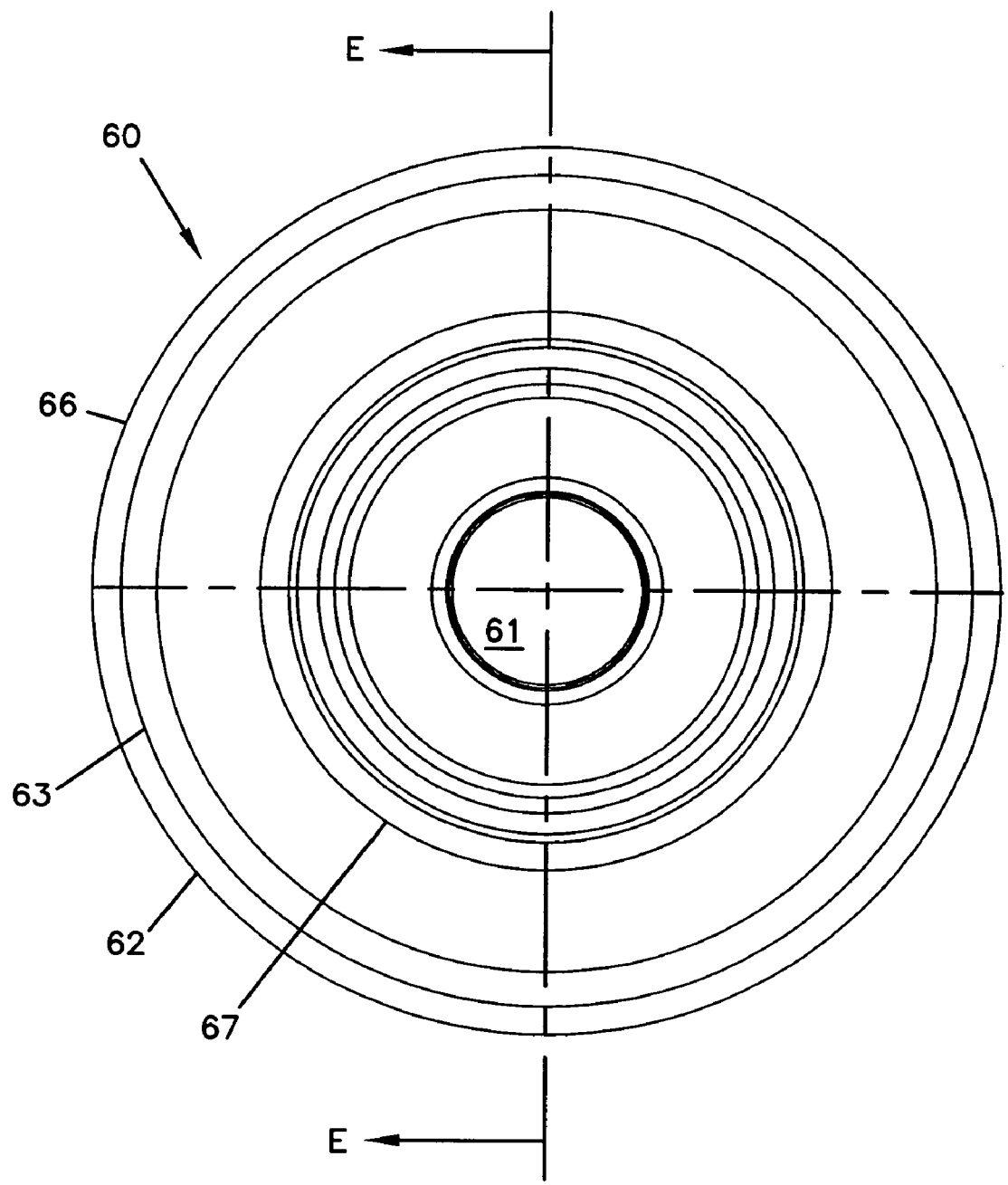
FIG. 4B represents one end view of the insert assembly of FIG. 4A.
Figure 4C:
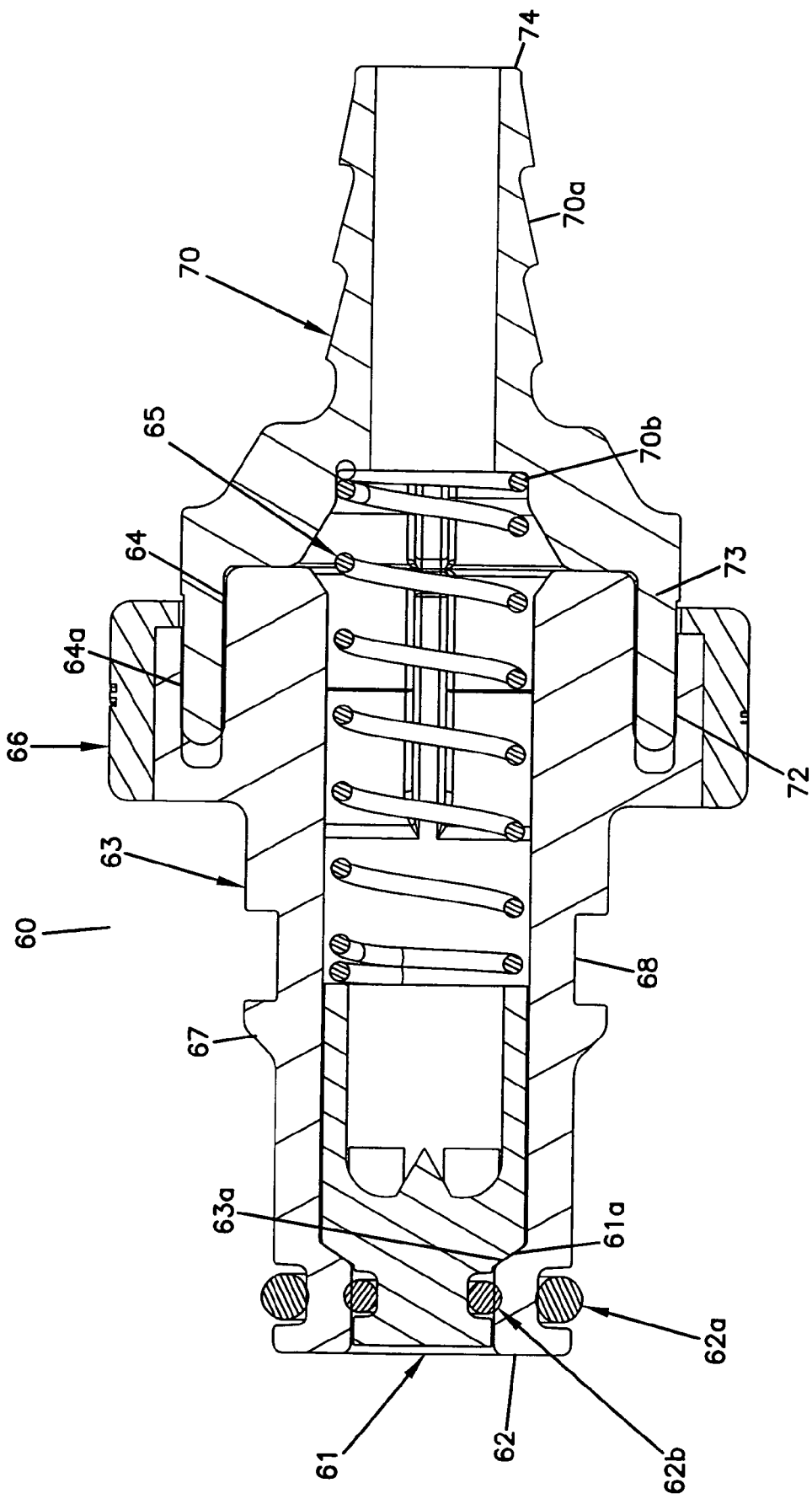
FIG. 4C represents a sectional view of the insert body of FIG. 4A taken from line E-E of FIG. 4B.

FIGS. 4A through 4C illustrate one example of an insert assembly 60 insertable into the coupling body 20. The insert assembly 60 includes a main body 63 having a first end 62 and a second end 64 with an opening therethrough. The first end 62 is insertable into the opening 29 of the coupling body 20 at the first end 22, and includes an o-ring 62a formed in a groove. The first end 62 sealingly engages the inner wall when inserted into the coupling body 20. The insert assembly 60 includes a poppet member 61 coaxially disposed within the main body 63. The poppet member 61 is slidingly engageable with the main body 63. A biasing member 65 is disposed coaxial within the main body 63, and resides between the poppet member 61 and the second end 64 of the main body 63. The biasing member 65 biases the poppet member 61 into sealing engagement with an inner surface of the main body 63, where an o-ring 62b contacts an inner wall of the main body 63. In this configuration, the insert assembly 60 is in a normally closed position.

When connected with the coupling body 20, the poppet member 61 is moveable and pushed back toward the second end 64 as the poppet member 61 engages the poppet member 51 of the valve assembly 50. Likewise, the first end 62 engages the sleeve 53 and pushes the sleeve 53 back toward the second end 24, while the o-ring 62a sealingly engages the inner wall of the coupling body 20 to form a fluid tight seal. The insert assembly 60 is connectedly retained in the coupling body 20 when a tapered surface 67 rides along and past the edge 43a for the edge 43b to move into the groove 68. As the inner member 43 reciprocates within the slot 26, the edges 43a, b can be depressed downward for the tapered surface 67 to pass through. Once the tapered surface 67 clears the inner member 43, the inner member 43 is biased back to its original position to lock the insert assembly 60. By depressing the actuating member 41, the insert assembly 60 can be disconnected and removed. This configuration is typical of quick connect/disconnect couplers and many variations may be employed using such principles.

An adapter 70 is connectable at the second end 64, and mates with a connecting means 64a through a fitting 73 at the end 72. A shoulder 70b provides a surface for the biasing member 65 to rest against. Similar to the adapter 57, a barbed structure may be employed at an end 74 opposite end 72. The barbed end 74 enables the insert assembly 60 to be connected with a piece of transport equipment or fluid transport system, such as a fluid source or fluid line (not shown).

The insert assembly 60 may also include an overmold 66 formed over at least a portion of the main body 63. Preferably, the overmold 66 is the same material as the overmold 33, and may be of the same color. In this configuration, the insert assembly 60 can be color-keyed with a similarly colored coupling body. Such a design may be useful for coupler and inserts requiring predetermined and specific connection.

Figure 5:
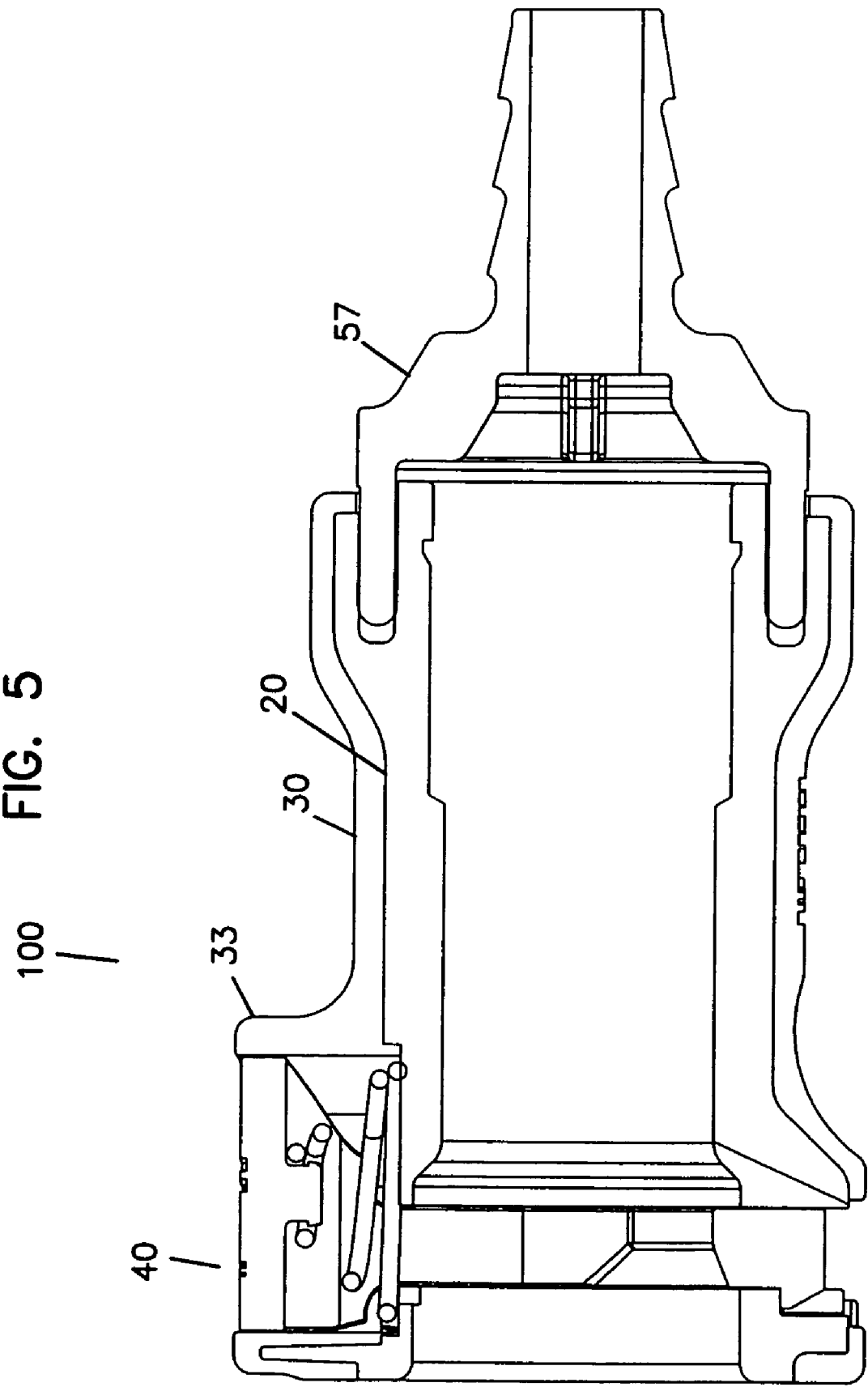
FIG. 5 represents the coupler body of FIG. 1A having one embodiment of a latch assembly connected thereto.

FIG. 5 illustrates another embodiment of a coupling device 100 showing the coupling body 20 with the overmold 30 and shroud 33 connected with the latch assembly 40. A fitting, such as the adapter 57 may be connected at one end so that the coupling device 100 is connectable with another piece of fluid transport equipment, for instance a well known fluid line (not shown). FIG. 5 illustrates the coupling device without the valve assembly shown in FIG. 3C. Similar parts and features are shown that have been detailed above and are not further discussed.

Figure 6:
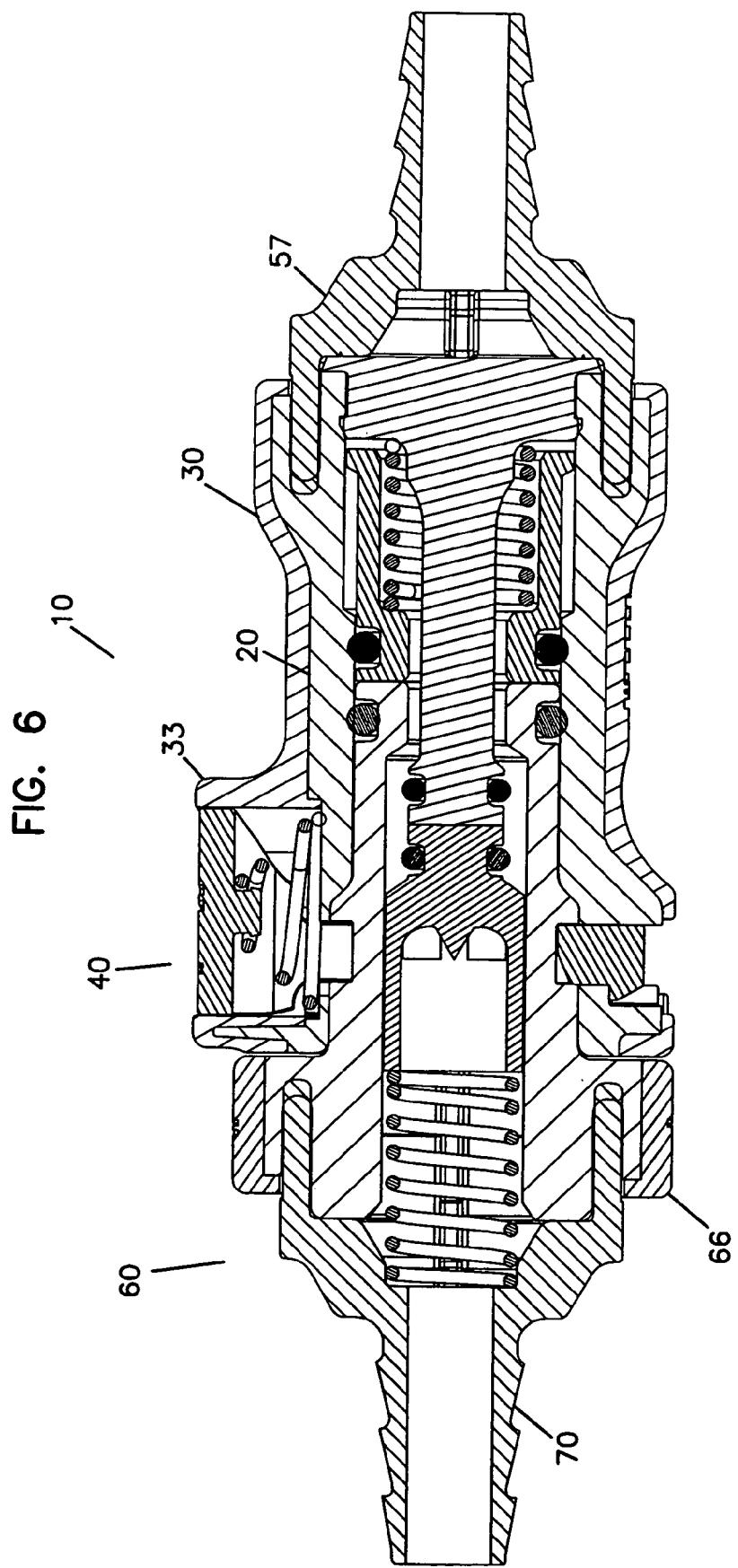
FIG. 6 represents the coupler device of FIG. 3A and the insert assembly of FIG. 4A connected together in an open position for enabling fluid flow therethrough.

FIG. 6 illustrates one preferred embodiment of a coupling relationship showing the coupling device 10 of FIGS. 3A-3C connected with the mating insert assembly 60 of FIGS. 4A-4C. The coupling device 10 and the insert assembly 60 are connected in an open position, as discussed above. Similar parts and features are shown that have been detailed above and are not further discussed.

Preferably, the latch assembly, valve assembly and insert assembly are made of molded parts, and more preferably, are made of a molded plastic material, such as the coupling body. The o-ring seals discussed preferably are made of a resilient material, such as a rubber material or the like. It will be appreciated the biasing members may be made of machined metal or a molded plastic material.

As discussed above, the present invention provides advantages for a coupling device. By forming a coupler body with the overmold as described above, the coupler body can be molded with tight, specific dimensions, while the overmold can form the shroud portion. The shroud portion covers and protects any irregular shapes residing outside the outer surface of the coupler body. The coupler body can be formed to avoid distortion or any added windaging inside the bore. By forming the overmold as a separate layer outside the coupling body, the outer shape of a coupler can be modified to protect external structures disposed outside the coupler body, such as those in a latch assembly. In this manner, the need to fine-tune the coupling body back to specific dimensions can be avoided. Further, seal surfaces that can require specific dimensions, may be protected as distortion of the coupling body is prevented. The coupling body is formed as a substantially uniform and symmetrical part, where any seal surfaces and/or other assembly interfaces that require tight tolerances are preserved. In this configuration, the coupling body may be molded using standard core pins, while enabling the cycling of the part to be made faster. The present invention provides a more convenient coupler that can be produced faster and at low cost using inexpensive materials and standard equipment.

Having described the embodiments of the present invention, modifications and equivalents may occur to one skilled in the art. It is intended that such modifications and equivalents shall be included with the scope of the invention.

What is claimed is:

1. A method of making a molded coupler, the method comprising:
    molding a circumferential body having an outer surface, a first end, a second end, and an opening extending through the first and second ends, and the body defining a slot disposed proximate one of the first end or the second end, the slot extending in a direction transverse to the opening and through the outer surface;
    molding an overmold portion over the outer surface of the body; and
    locating a latch assembly within the slot, the latch assembly including at least one outer member protruding from the outer surface of the body.

2. The method of claim 1, further comprising connecting the outer member with an inner member disposed through the slot.

3. The method of claim 1, wherein the body is substantially uniform in thickness throughout an entire longitudinal length from the first end to the second end of the body.

4. The method of claim 1, wherein the overmold portion is irregular in thickness along a longitudinal length of the overmold portion.

5. The method of claim 1, further comprising molding a shroud portion during molding of the overmold portion, the shroud portion protruding a distance transverse to the outer surface of the body.

6. The method of claim 5, wherein the distance the shroud portion protrudes from the outer surface is such that the shroud portion at least partially covers the outer member of the latch assembly.

7. The method of claim 6, wherein the distance the shroud portion protrudes from the outer surface is at least a same distance as the outer member protrudes from the outer surface.

8. The method of claim 1, wherein the steps of molding the body and molding the overmold portion are performed using injection molding.

9. The method of claim 8, wherein the steps of molding the body and molding the overmold portion are performed using a two-shot molding process.

10. The method of claim 9, wherein the two-shot molding processes includes:
    forming the body; and
    subsequently forming the overmold portion over the body.

11. The method of claim 1, wherein the body includes a plastic material, and the overmold portion includes a thermoplastic material.

12. The method of claim 11, wherein the body is polypropylene, and the overmold portion is thermoplastic rubber.

13. A method of making a molded coupler, the method comprising:
    molding a circumferential body having an outer surface, a first end, a second end, and an opening extending through the first and second ends, and the body defining a slot disposed proximate one of the first end or the second end, the slot extending in a direction transverse to the opening and through the outer surface, and the body being substantially uniform in thickness throughout an entire longitudinal length from the first end to the second end of the body;
    molding a soft overmold portion over the outer surface of the body, the overmold portion being irregular in thickness along a longitudinal length of the overmold portion; and
    locating a latch assembly within the slot, the latch assembly including at least one outer member protruding from the outer surface of the body.

14. The method of claim 13, further comprising molding a shroud portion during molding of the overmold portion, the shroud portion protruding a distance transverse to the outer surface of the body.

15. The method of claim 14, wherein the distance the shroud portion protrudes from the outer surface is such that the shroud portion at least partially covers the outer member of the latch assembly.

16. The method of claim 15, wherein the distance the shroud portion protrudes from the outer surface is at least a same distance as the outer member protrudes from the outer surface.

17. A method of making a molded coupler, the method comprising:
    injection molding a circumferential body having an outer surface, a first end, a second end, and an opening extending through the first and second ends, and the body defining a slot disposed proximate one of the first end or the second end, the slot extending in a direction transverse to the opening and through the outer surface, and the body being substantially uniform in thickness throughout an entire longitudinal length from the first end to the second end of the body;
    injection molding a soft overmold portion over the outer surface of the body, the overmold portion being irregular in thickness along a longitudinal length of the overmold portion; and
    locating a latch assembly within the slot, the latch assembly including at least one outer member protruding from the outer surface of the body.

18. The method of claim 17, wherein the steps of molding the body and molding the overmold portion are performed using a two-shot molding process.

19. The method of claim 17, wherein the body is polypropylene, and the overmold portion is thermoplastic.

* * * * *